(12) United States Patent
Gersabeck et al.

(10) Patent No.: US 6,529,608 B2
(45) Date of Patent: Mar. 4, 2003

(54) SPEECH RECOGNITION SYSTEM

(75) Inventors: David Gersabeck, Commerce Township, MI (US); Scott Howard Gaboury, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 224 days.

(21) Appl. No.: 09/769,900

(22) Filed: Jan. 26, 2001

(65) Prior Publication Data

US 2002/0102002 A1 Aug. 1, 2002

(51) Int. Cl.[7] .......................... H03G 3/20; G10L 21/00; H04B 1/00
(52) U.S. Cl. .................. 381/110; 381/86; 704/270; 704/275
(58) Field of Search ...................... 381/110, 86, 92; 704/270–275, 500–504; 455/567–569

(56) References Cited

U.S. PATENT DOCUMENTS

| | | | |
|---|---|---|---|
| 4,586,195 A | 4/1986 | DeGeorge et al. | 381/122 |
| 5,214,707 A | 5/1993 | Fujimoto et al. | 381/92 |
| 5,801,616 A * | 9/1998 | Ghazarian et al. | 340/426 |
| 6,449,593 B1 * | 9/2002 | Valve | 704/233 |

FOREIGN PATENT DOCUMENTS

JP  0472356 A1 * 2/1992 ................. 704/275

* cited by examiner

*Primary Examiner*—Minsun Oh Harvey
*Assistant Examiner*—Laura A. Grier

(57) ABSTRACT

A speech recognition system 7 for an automotive vehicle 10 is provided including a microphone receiver 12 for receiving a voice audio signal and converting the same to an analog signal 13, a microphone aimer for giving the microphone receiver 12 a locational bias for reception, an analog to digital converter 15 for converting the analog signal to a digital signal, a speech recognizer 17 for recognizing a voice from the digital signal received from the analog to digital converter 15, an occupant restraint system 22 having an occupant informational system 60/18 to control deployment of the occupant restraint system 22 resultant upon an occupant condition, an occupant restraint system signal generator 18 for signaling the occupant condition to the microphone aimer to locationally bias the reception of the microphone receiver 12.

17 Claims, 1 Drawing Sheet

SPEECH RECOGNITION SYSTEM

FIELD OF THE INVENTION

The present invention relates to speech recognition systems in automotive vehicles. The speech recognition system of the present invention can be utilized to control various functions of the vehicle which are normally controlled manually. More particularly, the present invention relates to speech recognition systems in automotive vehicles that utilizes data generated by a passenger restraint system to more accurately audibly aim a microphone receiver of the speech recognition system.

BACKGROUND OF THE INVENTION

To enhance the driving experience, speech recognition systems have been proposed for automotive vehicles. The speech recognition system can allow the vehicle operator to control by voice various functions which were previously manually controlled. Examples of the application of a speech recognition system can be in control of an entertainment system including radio and recorded music players, heating, air conditioning and ventilation system, automatic dialing through a cell phone connection, controlling wipers, rear view mirrors and vehicle seat adjustment. One major advantage of a speech recognition system is that it allows the vehicle operator to control the aforementioned functions without being distracted by physically having to manipulate various controls.

In many non-automotive speech recognition systems, a microphone is held by the user of the system or a microphone is connected with a head set which is worn by the system operator. In applications in automotive vehicles, such aforementioned apparatuses are typically unacceptable. A further challenge in automotive speech recognition systems is that the microphone receiver should have the capability of locational bias for reception in order to minimize outside road noise and noise created by vehicle occupants, other than the desired operator of the speech recognition system. To resolve the above noted challenges, it is desirable that the microphone receiver have a strong locational bias ability so that it may dynamically adjust the reception cone. To achieve the above, various sensors are required to determine the origin of the speech commands given by the voice recognition system operator. The voice recognition system operator may be a driver or passenger which the voice recognition system has given permission to originate such commands. However, the above noted sensors greatly add to the complexity and to the cost of a speech recognition system. In order to bestow on the greatest amount of people the benefits of a speech recognition system which can dynamically optimize the aiming of an adaptive beam forming microphone receiver, it is desirable that the cost of such a system be minimized. Accordingly, it is desirable to lower the cost of the aforementioned speech recognition system by minimizing the requirement for additional system sensors.

SUMMARY OF THE INVENTION

To make manifest the above delineated and other desires, a revelation of the present invention is brought forth. In a preferred environment, the present invention brings forth a speech recognition system for an automotive vehicle. The speech recognition system includes a microphone receiver for the reception of audio voice signals. The microphone receiver converts the audio signals to an analog signal. A microphone aimer is provided for giving the microphone receiver a locational bias for reception. The analog signal is delivered to an analog to digital converter. The digital signal is processed by noise cancellation and echo cancellation apparatus. The present invention also includes an occupant restraint system which has an occupant informational system to control deployment of the occupant restraint system resultant upon a condition of a vehicle's occupant. The present invention further has an occupant restraint system signal generator for signaling the occupant condition to the microphone aimer to locationally bias the reception of the microphone receiver.

It is an advantage of the present invention to provide a speech recognition system wherein the microphone for the speech recognition system can be locationally biased utilizing sensory information provided by an occupant restraint system of the vehicle. It is another advantage of the present invention to provide a speech recognition system having the features of a locationally bias microphone while reducing the requirement for speech recognition system dedicated sensors in regards to the locationally biasing of the microphone receiver.

Other advantages of the invention will become more apparent to those skilled in the art from a reading of the following detailed description and upon reference to the drawings.

DETAILED DESCRIPTION OF THE INVENTION

Figure 2:
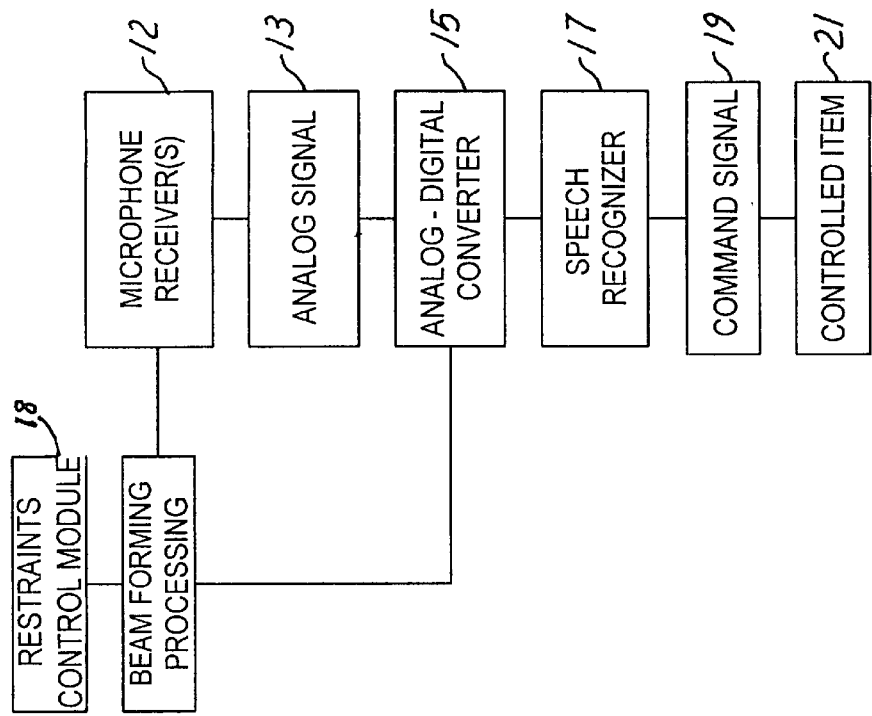
FIG. 2 is a flow chart of the speech recognition system of FIG. 1.
Figure 1:
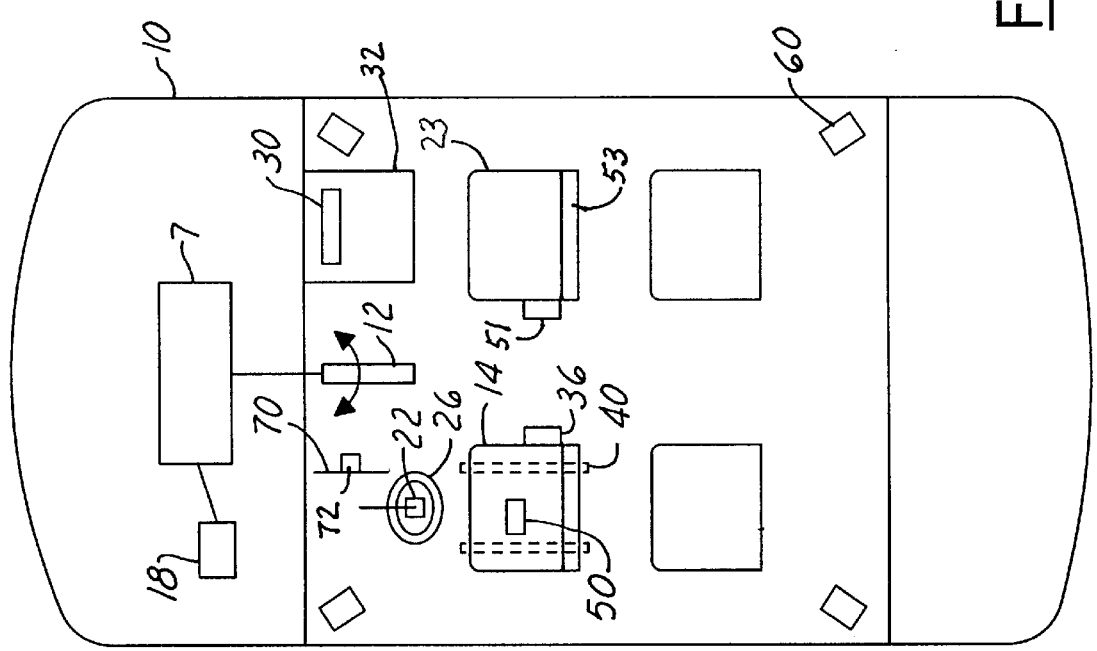
FIG. 1 is a schematic view of a preferred embodiment speech recognition system of the present invention in the environment of an automotive vehicle.

Referring to FIGS. 1 and 2, a vehicle 10 has a speech recognition system 7. The speech recognition system includes one or more microphone receivers 12. The microphone receiver 12 is typically positioned in the vehicle dashboard, an overhead console or in a rear view mirror in the vehicle 10. The microphone receiver 12 will be a microphone employing dynamic and electronic adaptive beam forming technology. The microphone receiver 12 is aimable along three dimensions for three coordinates including distance. The microphone receiver 12 receives an audio signal command from either an occupant sitting in the driver's seat 14 or in a passenger seat 23.

The microphone receiver 12 converts the audio signal to an analog signal 13. The analog signal 13 is forwarded by the microphone receiver 12 to an analog to digital converter 15. An example of an analog to digital converter 15 is a M-16, 16 bit analog to digital converter from Applied Speech Technologies. The analog to digital converter 15 presents a digital signal to a speech recognizer 17. The speech recognizer 17 is often commonly referred to as the voice recognition engine. Voice recognition engines are available from multiple suppliers including IBM, Lenert and Housby and Nuance. The speech recognizer 17 also incorporates noise cancellation and echo cancellation processing. The data from a restraints control module 18 is sent via a digital interface through a high speed vehicle communication channel that allows independent electronic control modules connected to a multiplex bus to share information. Typical data rates for the aforementioned vehicle communication channel, which is commonly referred to as a HS-CAN network, are 500 kbps. The speech recognizer 17 generates a command signal 19 to a controlled item 21 which is controlled by the speech recognition system. An example of a controlled item 21 could be a voice activated dialed cell phone or a voice tuned radio, or a voice responsive vehicle ventilation fan adjuster.

The vehicle 10 also has an advanced vehicle restraint system (ARS) which includes a driver side inflatable air bag 22 which is mounted on the steering wheel 26. On the passenger side an inflatable air bag 30 is mounted in the dashboard 32. The vehicle restraint system control module 18 is electrically connected with the air bags 22 and 30. The vehicle restraint system can include several sensors that are used to provide information to classify and/or locate the front seat occupants. The classification and location data is in turn used to optimize control deployment of the ARS to the particular combination of occupants and position of occupants in crash scenarios. For example, a smaller occupant located close to the steering wheel 26 or to the dashboard 32 may not warrant an air bag deployment in some crash events while a larger occupant sitting well away from the steering wheel 26 or far back in the passenger seat 23 may receive a maximum power air bag deployment. Other combinations may receive a partial air bag deployment. The data from the ARS occupant classification and location sensors is read and processed by the restraints control module 18. The restraints control module 18 can send this data to the vehicle control communications network for use in the speech recognition system 7.

One type of ARS sensor which can be used is a seat track position sensor 36. The seat track position sensor 36 consists of two parts. A fixed vane device is attached to the seat 14 and a Hall-Effect sensor and magnet is attached to the seat track 40. The vane moves along with the seat 14, as the seat 14 moves through the Hall-Effect and magnet combination. The seat track position sensor 36 reports to the restraints control module 18 on the position of a vehicle seat occupant. The restraints control module can report that seat 14 is forward or rearward at a predefined point along the seat track 40. The data from the seat track position sensor 36 via the restraints control module 18 can be fed over analog interface or the aforedescribed digital bus to the voice recognition system 7. The restraints control module 18 can analyze the data from the seat track position sensor 36 using various techniques. In a first manner, the position of the seat 14 is known from the data supplied by the sensor 36. This data is supplied to the voice recognition system and the microphone receiver 12 is aimed in the defined x and y direction (horizontal plane). For aiming in the z axis (vertical direction) several techniques can be utilized. One technique is to assume that the seat occupant is of a predetermined height which represents the greatest distribution of height of seat occupants. Accordingly, since the position of the seat with respect to the vehicle is known it is assumed that the seat occupant is the person of that predefined height and therefore the z axis coordinate and distance information will be known. A second slightly more refined technique is to assume that a seat occupant who adjusts his or her seat closer to the vehicle front is of a shorter height and a seat occupant which adjusts his or her seat to a more rearward position is of a taller height. A truth table is generated to define the z axis information.

In further refinements of the above noted system, the ARS can utilize a sensor 50 which is a flexible silicon filled bladder which is positioned in the vehicle seat cushion and suspension of the seat 14. When an occupant sits in the seat, the bladder is compressed and a pressure transducer outputs a signal proportional to the level of compression. A microprocessor monitors the pressure data and uses predefined calibration data and mathematical algorithms to assign a classification to the occupant (empty seat, small occupant, large occupant). Once the occupant classification is made, a height determination can also be generated.

Still another technique is for the sensor 50 to be a pressure sensitive mat embedded into the seat cushion or seat back cover. The mat contains a series of force sensitive pads arranged strategically across the seat surface and contours. Each pad changes its electrical parameters from pressures applied. A microprocessor monitors each pad and uses mathematical algorithms to assign a classification to the occupant (empty seat, small occupant, large occupant).

In another technique, force sensitive sensors in the seat 14 mounting posts for the track 40 are utilized. The system measures the downward force on each attachment point of the track 40 to determine the total weight of the occupant and the location of the occupant's center of gravity.

In yet another technique of the present invention, seat classification data is determined by a sensor 51 which monitors the relative angular position of an adjustable seat back 53 with the remainder of the seat 23. This system has the added benefit that when the sensor 51 determines that the seat back 53 is fully in the reclined position, this data can be utilized by the voice recognition system to totally ignore any commands of the occupant in the passenger seat when the passenger seat back is fully reclined. Sensors 60 in some applications can even give more refined data which can specify not only a general location of an occupant but can actually specify where an occupant's head is located. The sensors 60 can include electromagnetic measuring sensors such as cameras, infrared cameras, capacitive electric field or sonic (including ultrasonic) sensors. These sensors 60 either singularly or in combination with the aforementioned seat position sensors can give a more refined data to the exact location of the seat occupant. Accordingly, this data is communicated to the restraints control module 18 which is again communicated to the voice recognition system 7.

In a further embodiment of the present invention, where there are adjustable pedals 70, a pedal position sensor 72 is utilized to analyze an actual or assumed location of the vehicle seat occupant. This data is again communicated to the restraints control module 18 which is shared with the voice recognition system 7 in order to aim the microphone receiver 12.

While preferred embodiments of the present invention have been disclosed, it is to be understood that they have been disclosed by way of example only and that various modifications can be made without departing from the spirit and scope of the invention as it is encompassed by the following claims.

We claim:

1. A speech recognition system for an automotive vehicle comprising:

a microphone receiver for receiving a voice audio signal and converting the same to an analog signal;

a microphone aimer for giving said microphone receiver a locational bias for reception;

an analog to digital converter for converting said analog signal to a digital signal;

a speech recognizer for recognizing a voice from said digital signal received from said analog to digital converter;

an occupant restraint system having an occupant informational system to control deployment of said occupant restraint system resultant upon an occupant condition;

an occupant restraint system signal generator for signaling said occupant condition to said microphone aimer to locationally bias said reception of said microphone receiver.

2. A speech recognition system as described in claim 1, wherein the occupant condition is a position of said occupant in said vehicle.

3. A speech recognition system as described in claim 2, wherein said position of said occupant is at least partially determined based upon an adjusted position of a seat within said vehicle.

4. A speech recognition system as described in claim 3, wherein an electromagnetic sensor is utilized to determine a position of said occupant.

5. A speech recognition system as described in claim 4, having a plurality of sensors.

6. A speech recognition system as described in claim 2, wherein said position of said occupant is at least partially determined upon an adjusted position of a seat back within said vehicle.

7. A speech recognition system as described in claim 2, wherein a sonic sensor is utilized to determine a position of said occupant.

8. A speech recognition system as described in claim 7, having a plurality of sensors.

9. A speech recognition system as described in claim 2, wherein said position of said occupant is at least partially determined based upon a weight of said occupant on a seat within said vehicle.

10. A speech recognition system as described in claim 2, wherein said position of said occupant is at least partially determined based upon a pressure distribution of said occupant on a vehicle seat within said vehicle.

11. A speech recognition system for an automotive vehicle as described in claim 2, wherein said position of said occupant is at least partially determined based upon a pedal position of a positionally adjustable pedal assembly.

12. A speech recognition system for an automotive vehicle comprising:

a microphone receiver for receiving a voice audio signal and converting the same to an analog signal, said microphone receiver having an aimer employing dynamic and electronic adaptive beam forming;

an analog to digital converter for converting said analog signal to a digital signal;

a speech recognizer for recognizing a voice from said digital signals received from said analog to digital converter;

an occupant restraint system having an occupant informational system to control deployment of said occupant restraint system resultant upon seat occupant position, said occupant restraint system including sonic sensors to determine the position of said seat occupant within said vehicle; and an occupant restraint system signal generator for signaling said occupant position to said microphone aimer to locationally bias said reception of said microphone.

13. A speech recognition system as described in claim 12, wherein said position of said seat occupant is at least partially determined by a position of said seat in respect to said vehicle.

14. A speech recognition system as described in claim 12, wherein said sensors sense a position of said seat occupant is at least partially determined by a weight of said seat occupant.

15. A speech recognition system as described in claim 12, wherein said sensors sense a position of said seat occupant is at least partially determined by sensing a pressure distribution of said seat occupant upon a seat of said vehicle.

16. A speech recognition system as described in claim 12, wherein said sensors sense a position of a seat occupant is at least partially determined by sonically sensing a position of said seat occupant within said vehicle.

17. A speech recognition system as described in claim 12, wherein said sensors sense a position of said seat occupant is at least partially determined by sensing a position of an adjustable pedal assembly.

* * * * *